June 13, 1961 J. J. NEFF 2,988,294

MAGNETIC TAPE APPARATUS

Filed Aug. 13, 1959 4 Sheets-Sheet 1

JOSEPH J. NEFF
INVENTOR.

BY

ATTORNEYS

JOSEPH J. NEFF
INVENTOR.
BY Flehr and Swain
ATTORNEYS

JOSEPH J. NEFF
INVENTOR.

BY Flehr and Swain

ATTORNEYS

MAGNETIC TAPE APPARATUS

Filed Aug. 13, 1959

4 Sheets-Sheet 4

JOSEPH J. NEFF
INVENTOR.

BY Flehr and Swain
ATTORNEYS 2,988,294
MAGNETIC TAPE APPARATUS

Joseph J. Neff, Los Altos, Calif., assignor to Ampex Corporation, Redwood City, Calif., a corporation of California Filed Aug. 13, 1959, Ser. No. 833,641
9 Claims. (Cl. 242—55.12)

This invention relates generally to magnetic tape apparatus and more particularly to a pneumatic control system therefor.

In magnetic tape apparatus, it is important to control the tension on the tape so that it is substantially equal on the two sides of the capstan drive. The capstan then sees a relatively constant load and will meter the tape past the heads at a constant velocity, minimizing flutter and wow.

Generally, in magnetic tape machines of the type having supply and take-up reels mounted on a motor driven turntable with braking means associated with each turntable, proper tape tension may be achieved by applying a braking effort to the supply reel, by reversing the drive motor associated with the supply reel, or both. Furthermore, in certain system, a mechanical servo system is employed to control the tension.

In general, magnetic tape machines include means for de-energizing the various drives in the event that the tape breaks, thus minimizing tape spillage. In the prior art, photoelectric and mechanical sensing systems have been provided.

It is an object of the present invention to provide a pneumatic servo system for controlling the tape tension.

It is another object of the present invention to provide a pneumatic tape tension system which will turn off the apparatus in the event of tape breakage.

It is a further object of the present invention to provide a system in which the tape passes over a tape guide having an orifice supplied with a constant volume of air or fluid. The back pressure serves to activate a control means for controlling the power applied to the turntable drive means.

Various means have been suggested in the prior art for sensing the end of tape. For example, arms which extend into the reel are provided. The arms serve to activate a switch which turns off the apparatus when the reel is completely unwound. It is another object of the present invention to provide a pneumatic end of reel sensing device.

It is often necessary to change tape guides employed in a magnetic tape for accommodating various sizes of tape. In accordance with the present invention, there is provided convertible tape guides which form a portion of the pneumatic system.

These and other objects of the invention will become more clearly apparent from the following description when taken in conjunction with the accompanying drawing.

Referring to the drawing:

FIGURE 1 is a plan view of the top plate of a magnetic tape apparatus incorporating the present invention;

FIGURE 2 schematically illustrates a pneumatic end of reel sensing system in accordance with the invention;

Figure 1:
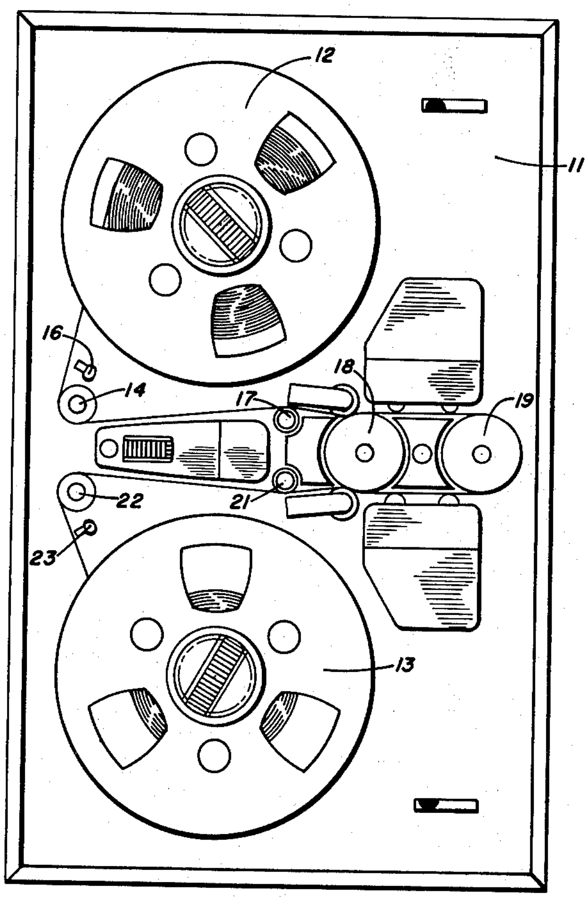

The tape transport illustrated in FIGURE 1 includes a top plate 11 which carries supply and take-up reels 12 and 13, respectively. Each of the reels is carried on a turntable which is suitably driven by a motive means, for example, an electric motor (not shown). The tape extends from the supply reel over guide post 14. An end of tape sensing post 16, to be presently described in detail, is disposed between the guide post 14 and the reel 12. It is located so that it is engaged by the magnetic tape when the supply reel is empty. It will be observed that as the supply reel is emptied, the direction of travel of the tape extending therefrom will be towards the axis and eventually the tape will extend past the post 16.

The tape on leaving the guide post 14 travels over another guide post 17, thence over the capstan 18, over a turn-around idler 19, past the other side of the capstan 18, and over a guide post 21. The capstan arrangement shown including the closed tape loop type minimizes the amount of tape extending between the capstan and the adjacent idler.

On leaving the guide post 21, the tape passes over the guide post 22 and onto the take-up reel 13. A second end of reel 23 is provided between the guide post 22 and reel 13 and functions in a manner similar to that described with respect to the post 16.

Figure 2:
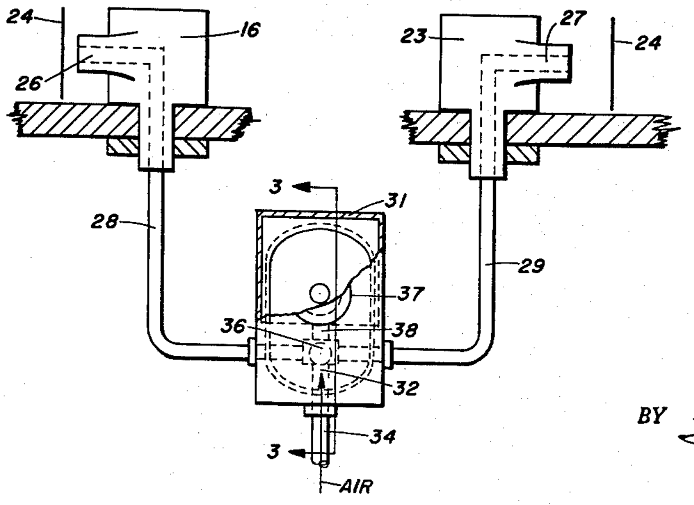
Figure 3:
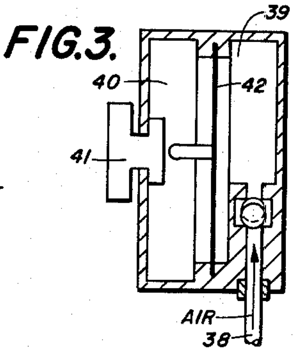
FIGURE 3 is a side elevational view, partly in section, of the transducer used in the system of FIGURE 2.

Referring to FIGURE 2, a schematic diagram of the end of reel sensing system is shown. The tape 24 is shown extending adjacent the two posts 16 and 23. It is observed that the tape associated with the post 16 is relatively near the orifice 26 formed in the adjacent face of the post, while the tape is disposed a substantial distance from the orifice 27 formed in the post 23 which indicates the reel 12 is nearly empty. The orifices 26 and 27 are connected through the air supply lines 28 and 29 to a pressure transducer 31. Air is supplied through the opening 32. An orifice (not shown) may be provided in the supply line 34 leading to the transducer and serves to assure that air is delivered at a substantially constant rate. With the tapes removed, the pressure in the transducer will have one value. However, when the tape extends near one or the other of the orifices, the amount of air which flows from the orifice is reduced. The pressure on the ball 36 then serves to move the ball to block off the opposite passage and the pressure increases. A suitable transducer 37 is connected in the line 38. The pressure transducer may, for example, include a housing having chambers 39 and 40 (FIGURE 3) which are separated by a movable diaphragm 42. The line 38 is connected to the chamber 39 on one side of the diaphragm. When the pressure in the chamber 39 increases, the diaphragm moves to activate the switch 41 which is connected to the function control of the machine. In response, the function control deenergizes the various drives.

Thus, it is seen that there is provided a pneumatic end of reel sensing system which operates from an air supply source and which includes a pressure activated switch for providing a control signal to control operation of the apparatus.

Figure 4:
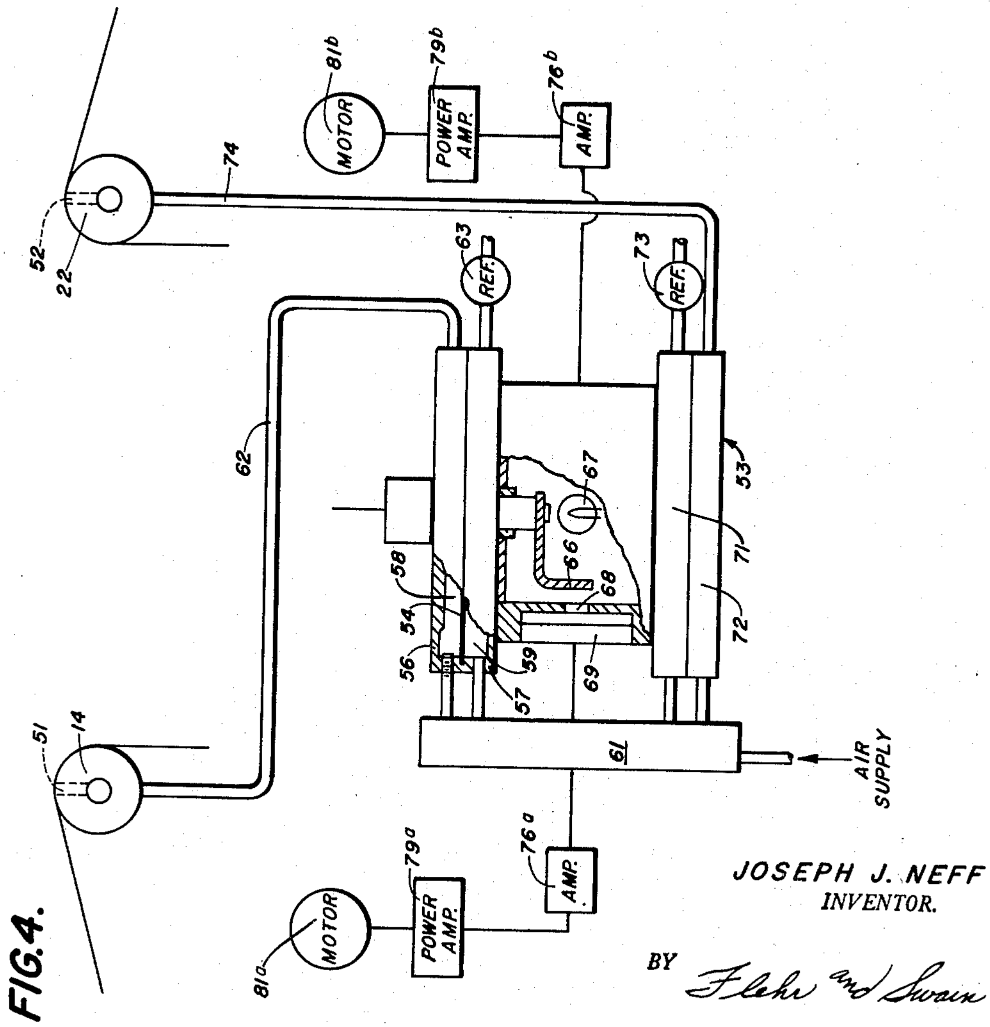
FIGURE 4 is a schematic diagram showing a pneumatic tape tensioning system in accordance with the present invention.

Referring to FIGURE 4, a pneumatic tape tensioning and broken tape sensing system is illustrated. The tape guides 14 and 22 are provided with orifices 51 and 52, respectively. Each of the orifices is associated with a pressure sensitive device. A complete description of a suitable pressure sensitive device will be presently given. However, for purposes of explanation, such a device 53 is schematically illustrated in FIGURE 4. The pressure sensitive device may, for example, comprise a flexible diaphragm 54 which is supported between chamber portions 56 and 57. Thus, a pair of pressure chambers 58 and 59 is formed. Air is supplied to the chambers from a manifold 61. Preferably, the air is supplied through an orifice (not shown) which limits the amount of air. The chamber 58 is connected to the orifice 51 by tubing 62. Thus, air travels through the tube 62 and flows outwardly from the orifice 51. The air flowing from the orifice forms a film of air under the tape which serves to lubricate the tape as it passes over the guide post. The lubrication is in the form of a thin film of air separating the tape and guide post. The pressure in the chamber 58 will be dependent upon the tension of the tape over the guide post 14. As the tension increases, the back pressure increases and, therefore, the pressure within chamber 58 also increases. A reference pressure is applied to the chamber 59. Air is supplied to the chamber from an orifice associated with the air supply manifold 61. A suitable pressure determining device 63, to be presently described in detail, is associated with the chamber and maintains a predetermined pressure within chamber 59. The device 63 may be set to give a pressure which corresponds to a given reference tape tension. Any deviation of tension of the tape travelling past the orifice 51 will be reflected as a pressure change in the chamber 58 and the diaphragm 54 is deflected.

The diaphragm is connected to provide a signal which is related to movement of the diaphragm. For example, a shutter 66 may be attached to the diaphragm and serves to control the amount of light projected by the light 67 passing through the opening 68. This shutter serves to control the amount of light impinging upon the photoelectric transducer 69.

A pair of pressure chambers 71 and 72 are similarly provided for controlling the tension on the tape passing over the guide 22. Thus, air is supplied from the manifold 61 to the chambers 71 and 72 through orifices. Reference pressure is maintained by the reference means 73 associated with one of the chambers and the orifice 52 is connected through tube 74 to the other chamber.

The electrical signal from the photo responsive elements is amplified by amplifiers 76*a* and 76*b* and applied to power amplifiers 79*a* and 79*b*. Variations in the output of the photo responsive elements associated with each of the tape guides serves to vary the amount of power supplied to the respective motors 81*a* and 81*b* which drive the supply and take-up reels. By controlling the amount of power supplied to the motors, the torque applied to the reels is controlled and, consequently, the tension on the tape extending from the associated reel is controlled.

Thus, it is seen that there is provided a pneumatic system which senses tape tension changes and automatically controls the amount of power applied to the respective turntable motor to control the torque applied and, therefore, the tension.

Figure 5:
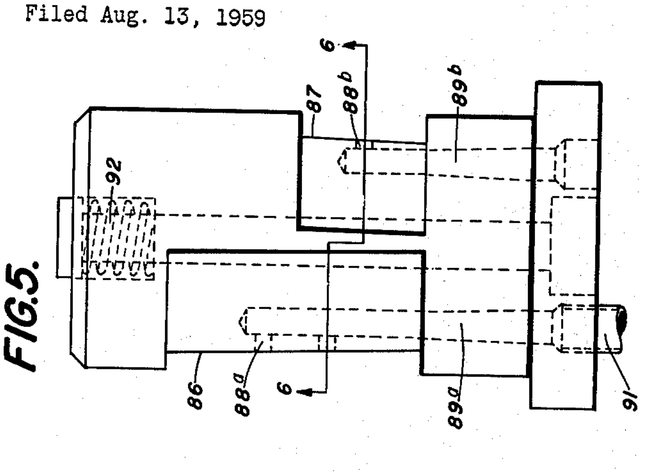
FIGURE 5 is a side elevational view of a convertible tape guide in accordance with the invention.
Figure 6:
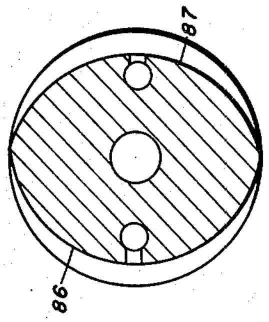
FIGURE 6 is a sectional view taken along the line 6—6 of FIGURE 5.

In accordance with the present invention, the tape guides 14 and 22 are of the type illustrated in FIGURES 5 and 6. They each include a pair of elliptical surfaces disposed diametrically across from one another and having a different width as illustrated by the portions 86 and 87 in FIGURE 5. Each of the surfaces includes an orifice 88*a* or 88*b* which is connected by the opening 89*a* or 89*b* to an associated supply line 91 which corresponds to the lines 62 or 74, respectively. It is observed that the guide is mounted with the tip of the supply line 91 seated lower within the tube portion 89*a* of the tube associated with the tape orifice. The device is spring loaded by spring 92 and may be lifted and rotated so that the tube 89*b* will register with the tubing 91. Thus, not only is the tape guide converted from one size tape to another but also it is accurately positioned by the upwardly extending tip of the tubing. Furthermore, this change connects the supply line 91 to the new orifice 88*b*. Thus, there is provided a convertible tape guide in which there is air lubrication and pneumatic tape tension sensing.

Figure 7:
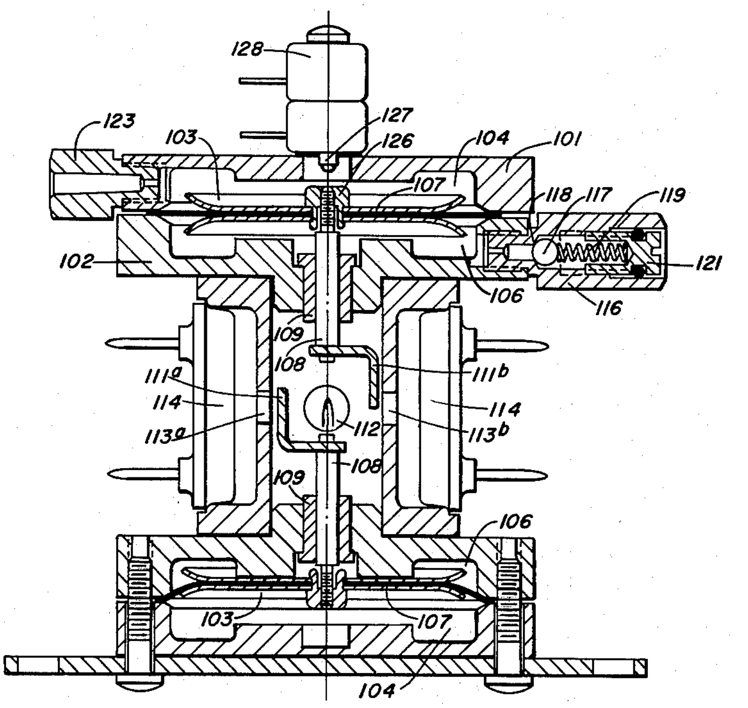
FIGURE 7 is a sectional view showing a pneumatic transducer employed in the pneumatic tension system of the present invention.
Figure 8:
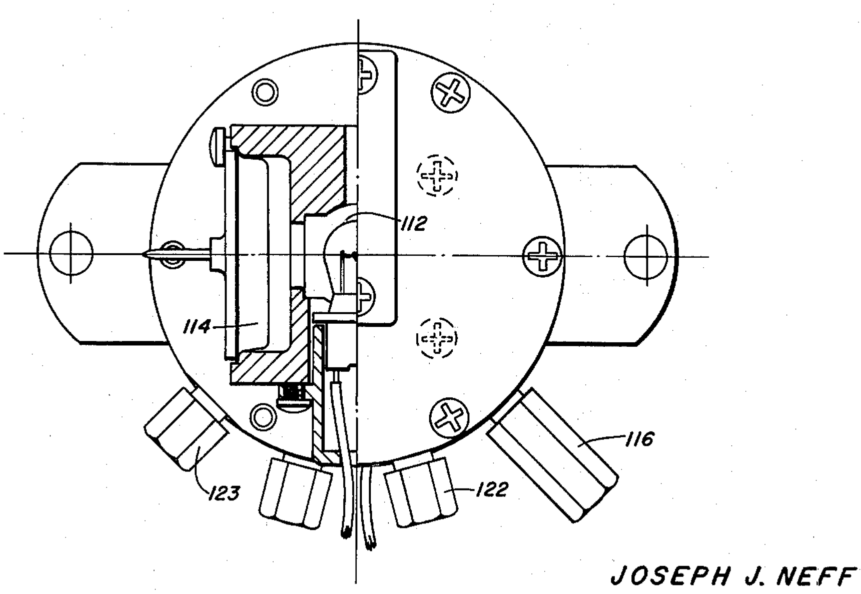
FIGURE 8 is a view, partly in section, of the transducer of FIGURE 7.

Referring to FIGURES 7 and 8, a transducer of the type schematically illustrated in FIGURE 4 is shown in detail. Referring to the upper portion of the figure, the pressure transducer shown there includes an upper wall portion 101 which mates with a lower wall portion 102 to define a chamber 103. The chamber 103 is divided into sub-chambers 104 and 106 by the flexible diaphragm 107. The peripheral edge of the diaphragm is suitably secured between the wall portions 101 and 102. A rod 108 is secured to the diaphragm and extends through the bushing 109. The free end of the rod carries a shutter 111*b* which is adapted to control the amount of light from the light 112 which travels through the opening 113*b* onto the photoresponsive element 114.

Air is supplied to the lower chamber 106 from a suitable supply line. A pressure relief valve 116 is provided for regulating the pressure within the chamber 106. For example, the valve may include a spring loaded ball 117 which is urged against its seat 118 by the spring 119. By controlling the compression of the spring as, for example, by rotating the adjustable screw 121, the amount of pressure in the cylinder 106 may be controlled. If the pressure exceeds this predetermined value, the ball will rise and allow air to escape to reduce the pressure. The tubing connection for supplying air in shown in FIGURE 8 at 122. Pressure is applied to the upper chamber 104 through the fitting 123. The fitting is in communication with the orifice, previously described. The pressure in the chamber is dependent upon the closeness of the magnetic tape to the orifice which, in turn, is controlled by the tension of the tape.

One end of the rod 108 has a button 126 which is adapted to engage the switch button 127. When the diaphragm moves upwardly for example, then the pressure in the chamber 104 is reduced. This reduction in pressure can take place if there is tape breakage and the associated orifice is wide open. The switch 128 is connected in circuit with the machine controls and will serve to turn off the apparatus to prevent spillage of tape due to the breakage.

In the lower portion of the figure, a second pressure transducer is illustrated. Since the elements in this transducer are identical to those described above, the transducer carries like reference numerals. It is to be observed that in the transducer as shown in this figure, the pressure in the chamber 103 has been considerably increased indicating that the tape tension is relatively high. The shutter 111*a* completely closes the opening 113*a* thereby serving to reduce or almost completely cut off power to the associated turntable motor allowing the tape tension to be reduced.

Figure 9:
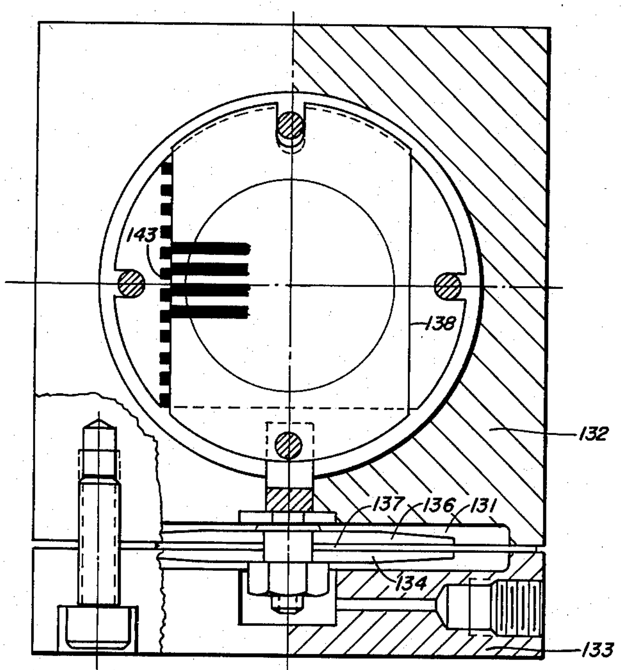
FIGURE 9 shows another pneumatic transducer.
Figure 10:
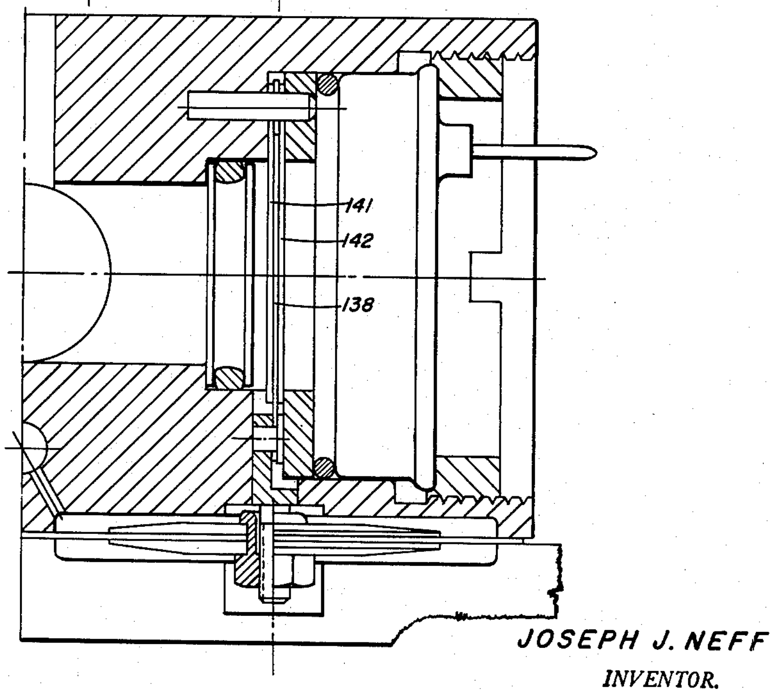
FIGURE 10 is a sectional view of the transducer shown in FIGURE 8.

Referring to FIGURES 9 and 10, a pressure transducer suitable for use in the invention is illustrated. The transducer includes a chamber 131 formed by the body parts 132 and 133. The chamber 131 is divided into sub-chambers 134 and 136 by the diaphragm 137 which is suitably sealed around its peripheral edge to the adjacent portions 132 and 133. Again, constant pressure of air is maintained on one side of the diaphragm, while the other side of the diaphragm is connected to a respective orifice. By adjustment of the reference air pressure, the diaphragm will move when the tape tension varies from a predetermined value.

In the instant apparatus, the diaphragm is connected to a shutter 138 which is in the form of an interdigitated structure including a plurality of parallel slots. The shutter 138 extends upwardly and is accommodated between a pair of shutters 141 and 142. The shutters 141 and 142 likewise carry a plurality of parallel slots 143 which, when the shutter 138 is in the proper position, line up with the slots in shutter 138 to pass light. However, with any variations from this position, portions of the slots will overlap and give a relatively sharp cut-off characteristic. A shutter of this type operates with a minimum of movement in comparison to the type of shutter shown with respect to FIGURES 7 and 8.

I claim:

1. A magnetic tape apparatus comprising supply and take-up reels, a reel drive means adapted to drive each of said reels, a magnetic tape extending between said reels, a guide post associated with each of said reels and engaged by the tape extending therefrom, each of said guide posts including a tension orifice on the surface engaging the tape, an end of reel sensing post including an end of reel orifice disposed adjacent each of said reels, said end of reel sensing post being disposed and mounted so that the orifice is closed by the magnetic tape extending between the adjacent guide post and reel when the tape is at the end of the reel, an air supply, means for supplying air to the tension orifices and to the end of reel orifices, pressure sensitive means connected in the air supply for the end of reel orifices, said pressure sensitive means serving to form a control signal when the orifice is closed, and pressure sensitive means connected in the air supply for the tension orifices, said pressure sensitive means serving to derive a signal for controlling the power applied to the associated reel drive means.

2. A magnetic tape apparatus comprising first and second spaced reels, an end of reel sensing device disposed adjacent each of said reels and located so that it is engaged by the tape when the associated reel is near the end of the tape, each of said sensing devices including an orifice adapted to be engaged by the tape, a supply line connected to each of said orifices, an air supply for said lines, means interposed between said air supply and both said lines and serving to automatically close off the line to one orifice when the other is engaged by the magnetic tape whereby the pressure in the system increases, and means responsive to said increase in pressure serving to form a control signal.

3. A magnetic tape apparatus comprising supply and take-up reels, drive means for each of said reels, a magnetic tape extending between said reels, guide posts associated with each of said reels and adapted to receive and guide the tape, a tension orifice formed in each of said guide posts, means for supplying air to said orifices whereby the air escapes under the tape to provide an air cushion for the tape and the pressure of the air is dependent upon the tape tension, pressure sensitive means connected in the air supply of each of said orifices, said pressure sensitive means serving to derive a signal which is dependent upon variations in pressure about a mean value corresponding to a predetermined tape tension, and means responsive to said signal for controlling the power applied to the drive means of the respective reel whereby the tension in the tape remains substantially constant.

4. A magnetic tape apparatus as in claim 3 wherein said pressure sensitive means comprises a chamber including a diaphragm, means for supplying a substantially constant pressure to one side of said diaphragm, means for connecting the other side of said diaphragm to the supply line, and means responsive to movement of said diaphragm for providing an output signal dependent upon the differences in pressure on the two sides of said diaphragm.

5. A magnetic tape apparatus as in claim 4 wherein said means responsive to movement of the diaphragm comprises a light source, a photoresponsive element, and a movable shutter connected to said diaphragm and serving to control in response to movement of the diaphragm the amount of light impinging upon the photoresponsive element.

6. In a magnetic tape apparatus having supply and takeup reels, a magnetic tape extending between said reels; the combination comprising guide posts associated with each of said reels and adapted to guide the tape, each of said guide posts having two guiding surfaces adapted to guide tape of different width, an orifice associated with each of said surfaces, an opening communicating with said orifice and extending downwardly through said guide, a supply line including a protruding portion engaging one of said openings, and means for rotatably mounting said guide whereby the other opening may be engaged with the supply line and the guide locked in a new position to present the other guide surface to guide a tape of different width.

7. A magnetic tape apparatus comprising supply and take-up reels, drive means for driving each of said reels, a magnetic tape extending between said reels, guide posts associated with each of said reels and adapted to receive and guide a tape, a tension orifice formed in each of said guide posts, means for supplying air to said orifice whereby the air escapes under the tape to provide an air cushion for the tape and the back pressure is dependent upon tape tension, pressure sensitive means connecting the air supply of each of said orifices, said pressure sensitive means serving to derive a signal which is dependent upon the variation of pressure about a predetermined value, and means responsive to said signal for controlling the power applied to the drive means of the respective reels whereby the tension in the tape remains substantially constant, said pressure sensitive means being further responsive to an absence of pressure to derive a control signal for turning off the apparatus.

8. A magnetic tape apparatus as in claim 7 wherein said pressure sensitive means comprises a chamber including a diaphragm, means for supplying air at substantially constant pressure to one side of said diaphragm, means for connecting the other side to the supply line, means responsive to movement of said diaphragm for deriving a signal for controlling the motor drive, and means responsive to extreme movement of the diaphragm in one direction for turning off the drive means.

9. A magnetic tape apparatus comprising supply and take-up reels, a magnetic tape extending between said reels, guide posts associated with each of said reels and adapted to receive and guide the tape, a tension orifice formed in each of said guide posts, an air supply, means for supplying air from said air supply to said orifice whereby the air escapes under the tape to provide an air cushion for the tape, the pressure in said supply being dependent upon tape tension, pressure sensitive means connected in the air supply means for each of said orifices, said pressure sensitive means comprising a chamber including a diaphragm, means for supplying air from said air supply to one side of said diaphragm, means for connecting the other side of said diaphragm to the air supply line means, and means responsive to movement of the diaphragm for providing an output signal dependent upon the difference in pressure on the two sides of the diaphragm.

References Cited in the file of this patent

UNITED STATES PATENTS

| | | |
|---|---|---|
| 1,964,874 | Fankboner | July 3, 1934 |
| 2,612,566 | Anderson et al. | Sept. 30, 1952 |
| 2,815,907 | McCormick | Dec. 10, 1957 |
| 2,854,198 | Lubkin et al. | Sept. 30, 1958 |
| 2,894,702 | Heath et al. | July 14, 1959 |